April 24, 1956 — E. C. ROLLINS — 2,743,005
CHAIN CARRIER
Filed April 21, 1953 — 2 Sheets-Sheet 1
FIG_1
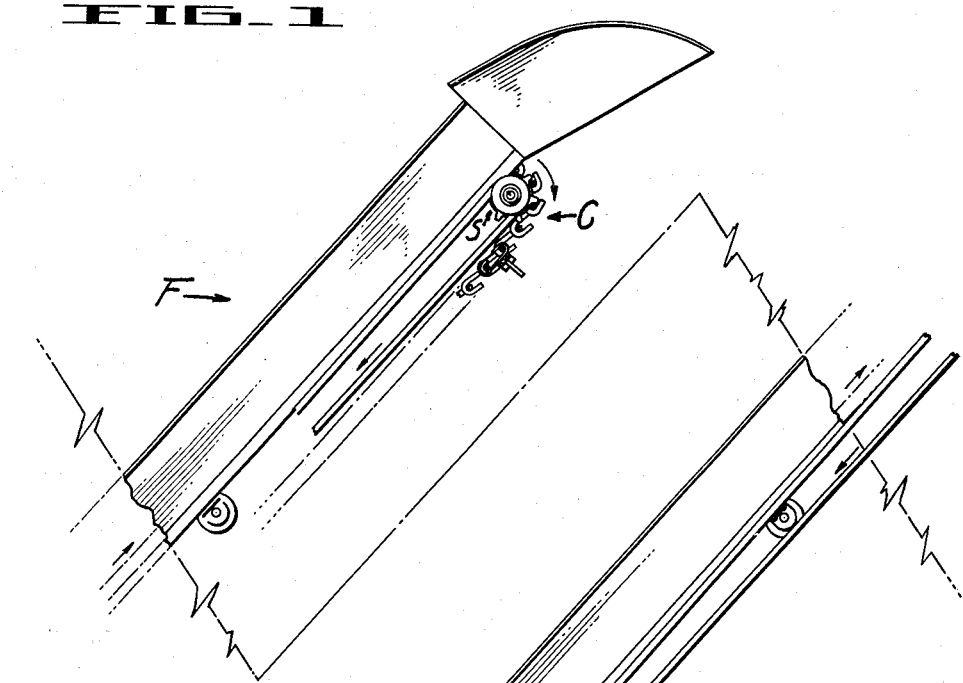
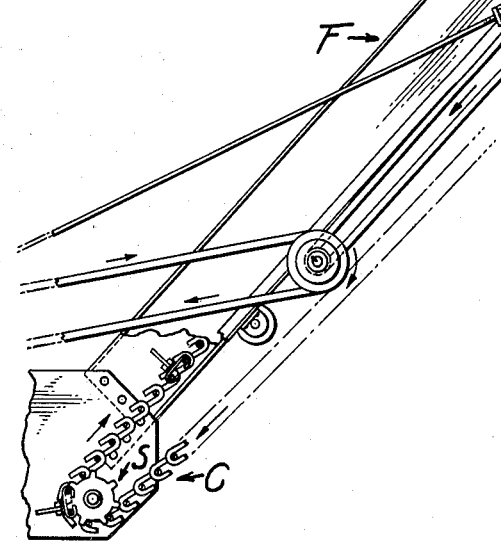
FIG_2
EUGENE C. ROLLINS
INVENTOR.
BY Mellin & Hanscom
ATTORNEYS

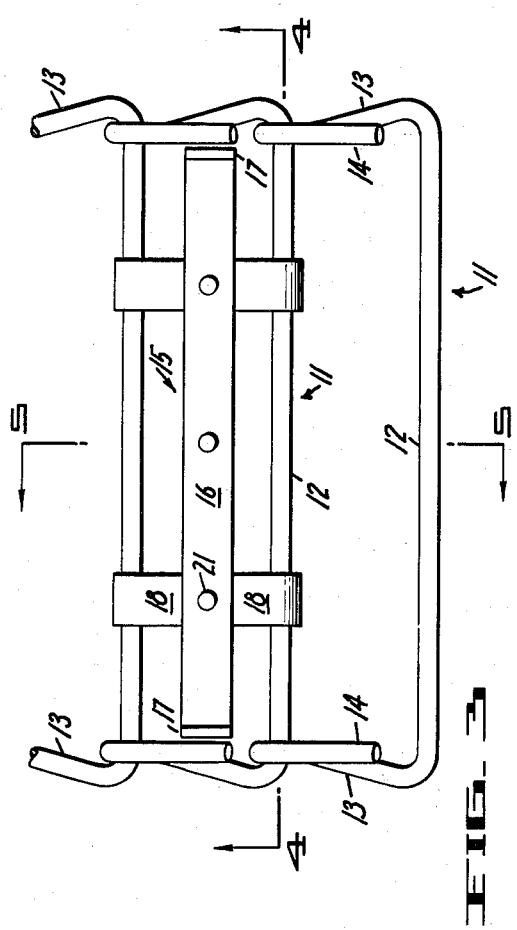
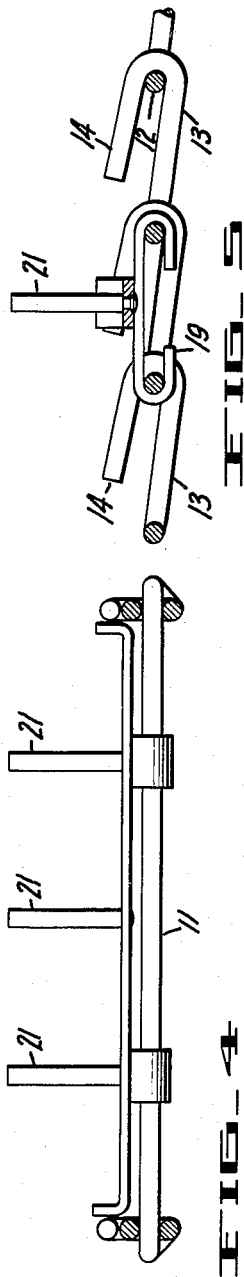
Eugene C. Rollins
INVENTOR.
BY
ATTORNEYS

United States Patent Office 2,743,005
Patented Apr. 24, 1956

2,743,005

CHAIN CARRIER

Eugene C. Rollins, Ogden, Utah, assignor of one-half to Jack W. McCollum, Ogden, Utah Application April 21, 1953, Serial No. 350,073

4 Claims. (Cl. 198—197)

This invention relates to and in general has for its object the provision of an endless crop carrier for use in conjunction with crop harvesters.

A further object of this invention is the provision of a crop carrier which readily can be attached to and detached from a conventional endless conveyor of the link chain type.

As is well known in the art, some types of link chain conveyors are made up of identical U-shaped links, each including a crossbar and outwardly extending legs terminating in open return bends or hooks, the hooks of one link being loosely engaged over the crossbar of the next succeeding link. When there is play or slack in a conveyor of this type, it is possible to disengage any given link from its next succeeding link.

It is a further object of this invention to provide a crop carrier which can be attached to or disengaged from a link conveyor of the type above referred to when there is slack in the conveyor.

More specifically, it is the object of this invention to provide a crop carrier having transversely extending hooked fingers arranged to be linked over the crossbars of the adjacent link of a link type conveyor and held thereto so long as there is no substantial slack in said conveyor.

The invention possesses other advantageous features, some of which, with the foregoing, will be set forth at length in the following description where that form of the invention which has been selected for illustration in the drawings accompanying and forming a part of the present specification, is outlined in full. In said drawings, one form of the invention is shown, but it is to be understood that it is not limited to such form, since the invention as set forth in the claims may be embodied in other forms.

Referring to the drawings:

Fig. 1 is a fragmentary side elevation of the upper end of an endless crop conveyor embodying the objects of my invention.

Fig. 2 is a fragmentary side elevation of the lower end to the conveyor illustrated in Fig. 1.

Fig. 3 is a top plane of 3 links of the endless conveyor illustrated in Figs. 1 and 2.

Fig. 4 is a section taken on the section line 4—4 of Fig. 3, and

Fig. 5 is a vertical mid-section taken on the section line 5—5 of Fig. 3.

As illustrated in Figs. 1 and 2, the objects of my invention have been embodied in an endless conveyor comprising an inclined frame generally designated by the letter F. Journaled at each end of the frame F are sprocket wheels S and meshing therewith is an endless conveyor of conventional link construction and generally designated by the letter C.

The conveyor C as shown in detail in Figs. 3, 4 and 5 is made up of a plurality of detachable links, each generally designated by the reference numeral 11, U-shape in configuration and each including a crossbar 12 and laterally extending legs 13 terminating in open return bends or hooks 14. As best shown in Figs. 3 and 4, the hooks 14 of one link are arranged to be hooked over or linked to the crossbar of the next succeeding link. It should be particularly noted that inasmuch as the hooks or return bends 14 are open, these links are free to move relative to each other along the longitudinal axis of the conveyor unless substantially all the slack therein has been taken up and if sufficient slack is provided, the links can be disengaged. The conveyor so far described is of conventional construction.

Detachably mounted on the crossbars 12 of selected pairs of links 11 are crop conveyors generally designated by the reference numeral 15. Each of these crop conveyors 15 includes a supporting strap 16 arranged to be disposed intermediate two adjacent crossbars 12 in parallelism therewith and terminating at its ends in upwardly extending stop flanges 17. The overall length of the supporting straps 16 should be slightly less than the distance between the two opposed return bends 14 of the links 11. Secured to or formed integral with each supporting strap 16 at longitudinally spaced points thereon are transversely extending fingers 18 terminating at their ends in hooks or return bends 19 which as best shown in Figs. 3, 4 and 5, are arranged to be linked or hooked over the crossbars 12 of two adjacent links 12. Here it should be particularly noted that the length of the fingers 18 is such that the overall width of each crop conveyor 15 is substantially equal to but not less than the overall width of each link 11. The reason for this is that when substantially all the slack has been taken out of the conveyor belt C, the fingers 18 should be locked on the crossbars 12 without at the same time being subjected to any substantial amount of tension.

Secured to and extending upwardly at spaced points along each of the straps 16 are crop engaging projections, here illustrated as pins 21 but which can take other desired and equivalent forms.

As a result of this construction, it will be seen that by providing sufficient slack in the link conveyor C, the crop conveyors 15 can be readily attached, removed or replaced or if any link of the conveyor C has been worn out and has to be replaced, the original crop conveyor unit can be attached to the replacement link.

In summary then it will be observed that I have provided a novel crop conveyor which can be readily attached to and detached from a conventional link conveyor and which in conjunction therewith forms a new conveyor. Also it is to be observed that the entire structure is simple, easily manufactured and is of such form that dirt from such crops as sugar beets and potatoes can pass therethrough as the crop moves forwardly with the conveyor.

Having thus described my invention, what I claim and desire to secure by Letters Patent is:

1. An endless conveyor comprising: a plurality of U-shaped links including a crossbar, and outwardly extending legs, each of said legs being provided with an open return bend, the bends of one link being hooked over the crossbar of the next succeeding link; a crop carrier detachably secured to and between the crossbars of selected pairs of adjacent links, each of said carriers including a supporting strap disposed between and parallel to said adjacent links and hooked fingers extending transversely of and secured to said strap, the free ends of said fingers being detachably hooked over said links; and outwardly extending crop engaging projections secured to said straps.

2. A readily detachable crop carrier for link conveyors comprising: a strap having a length substantially equal to the length of the links of said conveyor; longitudinally spaced transversely extending fingers secured to said strap, the free ends of said fingers having hooked ends arranged to be detachably hooked over the crossbars of the adjacent links of said conveyor, the overall width of said crop carrier being substantially equal to the overall width of one of the links of said conveyor; and outwardly extending crop engaging projections secured to said strap.

3. A crop carrier arranged to be detachably mounted on an endless conveyor formed by substantially identical U-shaped links each having a crossbar and hooked legs, the hooked legs of one link being linked over the crossbar of the next adjacent link comprising: a supporting strap having a length not greater than the distance between the legs of one of said links; longitudinally spaced transversely extending fingers secured to said supporting strap, the free ends of said fingers being hooked over the crossbars of said U-shaped links and the overall width of said carrier being substantially equal to the overall width of said links; and longitudinally spaced outwardly extending crop engaging projections secured to said strap.

4. A detachable crop carrier such as defined in claim 1 wherein the ends of said supporting strap serve to position and center said carrier between the opposed return bends of one of the links with which it is associated.

References Cited in the file of this patent

UNITED STATES PATENTS

| | | |
|---|---|---|
| 880,356 | Carter | Feb. 25, 1908 |
| 1,864,382 | Twentyman | June 21, 1932 |
| 2,296,810 | Dohlman | Sept. 22, 1942 |